United States Patent [19]

Etherington et al.

[11] Patent Number: 5,301,787
[45] Date of Patent: Apr. 12, 1994

[54] ARTICULATED SHUTTLECAR

[75] Inventors: Michael Etherington, Abingdon, Va.; Michael R. Long, Gainesborough, England

[73] Assignee: Dosco Overseas Engineering Ltd., Notts, United Kingdom

[21] Appl. No.: 906,569

[22] Filed: Jun. 30, 1992

[30] Foreign Application Priority Data

Jan. 14, 1992 [GB] United Kingdom ............... 9200678

[51] Int. Cl.$^5$ ............................................. B65G 41/00
[52] U.S. Cl. .................................................. 198/303
[58] Field of Search ......................... 198/303, 861.4

[56] References Cited

U.S. PATENT DOCUMENTS

| | | | |
|---|---|---|---|
| 2,543,519 | 2/1951 | Baechli | 214/83.36 |
| 2,592,532 | 4/1952 | Beck | 214/83.36 |
| 2,599,061 | 6/1952 | Lee | 214/83.36 |
| 2,613,800 | 10/1952 | Merck | 198/109 |
| 2,765,862 | 10/1956 | Tucker, Jr. | 180/51 |
| 2,777,526 | 1/1957 | Dudley | 180/2 |
| 2,777,530 | 1/1957 | Dudley | 180/77 |
| 2,879,884 | 3/1959 | Joy | 198/303 |
| 2,962,176 | 11/1960 | Russell | 214/83.36 |
| 2,970,664 | 2/1961 | Hoover et al. | 180/41 |
| 3,008,592 | 11/1961 | Johnson | 214/83.36 |
| 3,135,374 | 6/1964 | Anderson | 198/303 |
| 3,183,017 | 5/1965 | Lundquist | 280/34 |
| 3,185,324 | 5/1965 | Breithaupt et al. | 214/83.36 |
| 3,302,739 | 2/1967 | Beck et al. | 180/4 |
| 3,403,797 | 10/1968 | Lee et al. | 214/83.36 |
| 3,439,937 | 4/1969 | Dixon | 280/446 |
| 3,699,676 | 10/1972 | Beck | 60/52 S |
| 3,826,387 | 7/1974 | Galis | 214/90 |
| 3,827,720 | 8/1974 | Lee | 280/400 |
| 3,863,752 | 2/1975 | Sibley | 198/303 |
| 3,880,303 | 4/1975 | Coval | 214/83.36 |
| 3,908,841 | 9/1975 | Lee et al. | 214/83.36 |
| 3,939,958 | 2/1976 | Pyles | 198/7 R |
| 4,074,784 | 2/1978 | Lee et al. | 180/24 |
| 4,160,619 | 7/1979 | Nelson | 414/501 |
| 4,256,213 | 3/1981 | Shaw et al. | 198/303 |
| 4,291,777 | 9/1981 | Yale | 180/24.06 |
| 4,382,607 | 5/1983 | Voight | 280/408 |
| 4,576,107 | 3/1986 | Brasher | 116/227 |
| 4,711,502 | 12/1987 | Barnthaler et al. | 299/33 |
| 4,890,684 | 1/1990 | Simmons | 180/135 |
| 4,951,801 | 8/1990 | Mraz | 198/303 |
| 4,957,405 | 9/1990 | Roberts et al. | 414/339 |
| 5,044,858 | 9/1991 | Scott et al. | 414/10 |
| 5,152,389 | 10/1992 | Justice | 198/303 |

FOREIGN PATENT DOCUMENTS

| | | |
|---|---|---|
| 666032 | 7/1963 | Canada . |
| 1370019 | 7/1964 | France . |
| 2463691 | 2/1981 | France . |
| 355363 | 8/1961 | Switzerland . |

OTHER PUBLICATIONS

The FMC Shuttle-Ram: Custom-built to fit your mining operation Advertising Brochure.
The Greatest Coal Show in the World, Apr. 1976 Eimco-Elkhorn Advertising Brochure.
Elmco Advertising Brochure Joy Manufacturing Co., "Conveyor Assembly", May 25, 1974.

Primary Examiner—James R. Bidwell
Attorney, Agent, or Firm—Webb, Burden, Ziesenheim & Webb

[57] ABSTRACT

An articulated shuttlecar having two end sections and at least one center section with spaced longitudinal edges. A vertical pivot connecting the center section to one end of each end section. Each section has a pair of driven wheels mounted on an axis located approximately at its longitudinal center. A continuous flexible conveyor extends throughout the length of the sections of the shuttlecar to transport loose mined material from one end of the shuttlecar to the other end of the shuttlecar, and a continuous flexible retaining wall extends upwardly along each edge of all of the sections of the elongated shuttlecar to maintain loose mined material on the continuous flexible conveyor.

6 Claims, 2 Drawing Sheets

ARTICULATED SHUTTLECAR

BACKGROUND OF THE INVENTION

1. Field of the Invention

The invention relates generally to mine haulage vehicles and more particularly to a shuttlecar having a plurality of sections connected by articulation joints.

In underground mining, the loose mined material must be transported from the mine face to a haulage system for removal from the mine. It is often not possible to transport the loose mined material on a fixed conveyor. For example, the path which must be travelled by the material may be too long or tortuous, or it may intersect with major underground tunnels so that a fixed conveyor would create an unacceptable obstruction. In these and other circumstances, a vehicle is used to transport the loose mined material away from the mine face. Such a vehicle must be dimensioned to operate within the confines of the mine. It must be sufficiently low to permit it to operate on undulating terrain in low tunnels, and it must be able to negotiate short-radius turns between tunnels.

2. Description of the Prior Art

A number of vehicles have been designed to operate in mines. These vehicles include front end loaders, scoops, ram cars and shuttlecars. The scoops and ram cars have tractor sections including or connected to load-carrying cargo compartments. Such devices are manufactured by Envirotech Corp., and marketed under the EIMCO name.

In order to negotiate short-radius turns, some scoop-type vehicles are horizontally articulated about a vertical axis. This allows the vehicle to turn more easily at corners and to turn around after the loose mined material has been discharged. Turning a vehicle requires a relatively large area which limits the application of the prior art scoop-type vehicles.

Prior art shuttlecars have been designed to load and unload loose mined material without turning around. This is accomplished by using a central conveyor extending along the length of the shuttlecar to load and unload the material. Since the conveyor extends throughout the length of the shuttlecar, the load-carrying capacity of such a vehicle is relatively high.

However, the capacity of prior art shuttlecars with a conveyor is limited by the length, height and width of the vehicle. The height and width of the vehicle are dictated by the height and width of the mine tunnels in which the shuttlecar must operate and are fixed parameters. The length of a shuttlecar is dictated by the necessity of negotiating short-radius turns and undulations within mine tunnels. The longer the car, the less able it is to negotiate sharp turns and the more likely it is to be upset by undulations in the floors of the mine tunnels. In order to negotiate undulating mine floors, shuttlecars may be vertically articulated about a horizontal axis. Such a shuttlecar is disclosed, for example, in Canadian Patent No. 666,032 assigned to Joy Manufacturing Co.

A horizontally articulated shuttlecar is disclosed in U.S. Pat. No. 4,160,619. The vehicle disclosed in that patent has two body sections, each of which is necessarily shorter than a single-section shuttlecar and, thus, the carrying capacity of the vehicle is not substantially greater than a single-section shuttlecar. Furthermore, the majority of the load is carried in a compartment located at one end of the vehicle which equates the vehicle to a scoop-type vehicle with a discharge conveyor. The bulk of the vehicle remains lightly loaded, unlike a true shuttlecar wherein the load carrying compartment extends throughout the length of the vehicle. The vehicle disclosed in the patent is also deficient in that the horizontal articulation joint is not strong enough to withstand the normal wear which occurs in a mine.

SUMMARY OF THE INVENTION

The invention is a horizontally articulated shuttlecar, wherein the entire vehicle functions as a load-carrier. The shuttlecar can include as many connected sections as desired, with no theoretical limit on the total length of the vehicle although it will, of necessity, be limited by practical considerations.

According to one aspect of the invention, an articulated shuttlecar having at least three sections is provided wherein adjacent sections are connected by a vertical pivot to permit articulation of the vehicle in the horizontal plane.

Preferably, each section of the shuttlecar has at least one pair of wheels. Advantageously, each section has a single pair of wheels and all of the wheels are driven. The wheels of each section of the shuttlecar are located on a transverse axis located in a longitudinal central region of that section. At least one section of the shuttlecar is divided into two parts by a horizontal pivot, the axis of which corresponds to that of the wheels of that section. It is preferred that the horizontally pivoted section is not the front section or the rear section.

The location of the horizontal pivot on the wheel axis ensures that the car will occupy the least possible vertical space in a mine tunnel and that all of the wheels will remain in contact with the tunnel floor at all times. In a shuttlecar having more than three sections, it is advantageous for each section except the front section and the rear section to be divided into two parts connected by a horizontal pivot located on the wheel axis.

Preferably, each wheel on a section is suspended on an independent suspension system to provide for vertical adjustment of the individual wheels. An adjustable suspension system suitable for use with the wheels of a shuttlecar is disclosed in our co-pending U.S. patent application Ser. No. 07/906,758 filed contemporaneously herewith. This suspension system provides the vehicle with the ability to raise or lower both end sections to facilitate loading and unloading of the vehicle. In addition, the entire vehicle may be raised or lowered by the suspension system in order to clear obstacles on the mine floor. Furthermore, wheel replacement and repair are facilitated since the vehicle can be raised and then lowered onto a support placed in the vicinity of the mounting member for the wheel which is to be replaced or repaired. The vehicle will rest on the support and the wheel will remain above the ground for easy repair or replacement.

The upper run of a continuous conveyor extends throughout the length of the shuttlecar, which allows loading and unloading of the shuttlecar from both ends. The conveyor has a plurality of spaced flight bars and is well-known to those skilled in the art. The conveyor is entrained around sprockets at each end of the shuttlecar and the lower run passes below the floor of the shuttlecar. Each shuttlecar section is connected to its adjacent section by an articulation joint such as disclosed in our co-pending U.S. patent application Ser. No. 07/906,577 filed contemporaneously herewith.

The upper run of the conveyor is advantageously enclosed within spaced sidewalls which extend along the entire length of the vehicle, in order to prevent loose material from falling off the conveyor during transit. In the region of each articulation joint the side walls are formed with flexible members to accommodate the bending movement of the shuttlecar. The flexible members are similar to a basic leaf spring arrangement.

Steering of the shuttlecar is accomplished by piston and cylinder devices which exert forces between the inner ends of the end sections of the shuttlecar and the section to which they are connected to rotate the end section relative to the adjacent section about an articulation joint. The preferred steering mechanism is disclosed in our co-pending U.S. patent application Ser. No. 07/906,869 which is filed contemporaneously herewith. The advantage of this steering system is that, in cooperation with an electronic control system which is advantageously provided, each section of the all-wheel drive vehicle follows in the tracks of the immediately preceding section.

The shuttlecar of the invention is provided with a motor to drive the wheels on each section and an operator station is located on the front section and the rear section of the vehicle. The operator stations accommodate an operator in a reclining position. The shuttlecar is also provided with a cable reeler and a transmission system to drive the wheels.

A complete understanding of the invention will be obtained from the following description when taken in connection with the accompanying drawings wherein like reference characters identify like parts throughout.

DESCRIPTION OF THE PREFERRED EMBODIMENTS

Figure 1:
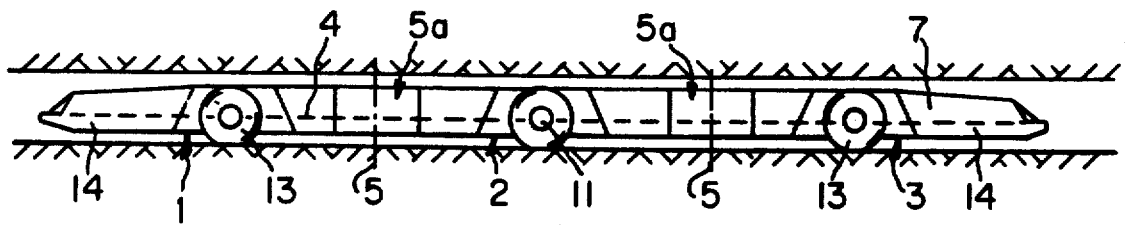
FIG. 1 is a schematic elevation of one embodiment of a shuttlecar in a mine tunnel.
Figure 2:
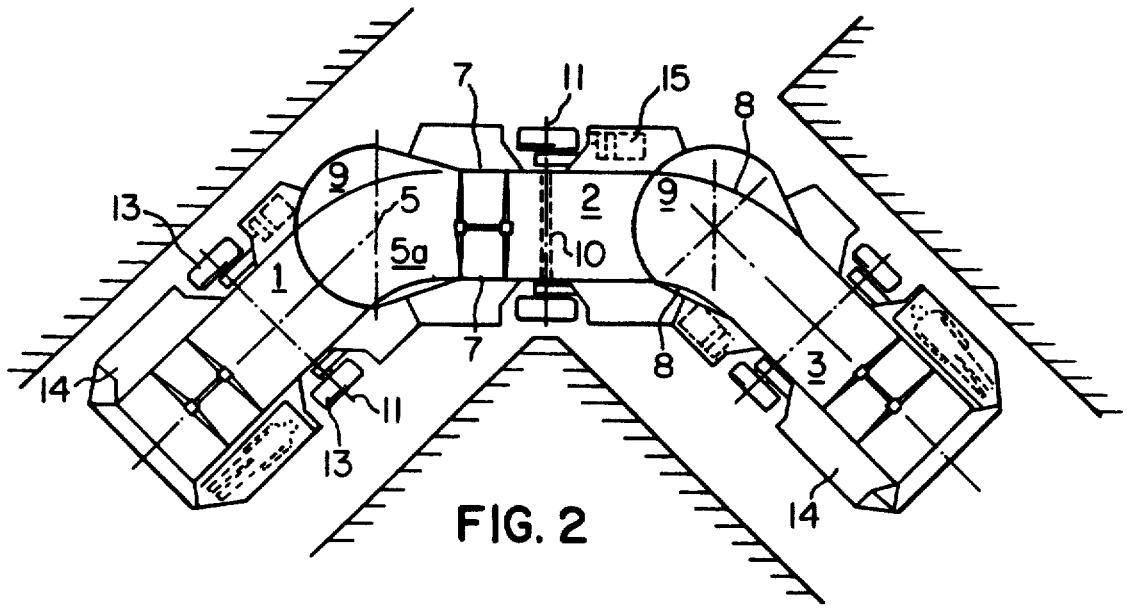
FIG. 2 is a plan view of the shuttlecar of FIG. 1, showing the shuttlecar in a turning mode.

With reference to FIGS. 1 and 2 of the drawings, the shuttlecar has an end section 1, a central section 2 and an end section 3. Each end section is provided with an operator station 14, which accommodates an operator in a reclining position to control the operation of the shuttlecar. The provision of an operator station in each end section means that the shuttlecar can be driven in both directions, and does not have to be turned around.

The shuttlecar has a continuous flexible conveyor 4, which is shown in a dotted line in FIG. 1 of the drawings. The conveyor extends throughout the length of the shuttlecar and has spaced transverse flight bars. The conveyor passes over sprockets which may be driven by a two-speed synchronous AC motor (not shown). The upper run of the conveyor is flanked by retaining walls 7, which define an elongated load carrying trough for the upper run of the conveyor. In the vicinity of pivot vertical axes 51, retaining walls 7 are constructed as a plurality of flexible overlapping members 8 which allow the walls to follow the edges of the conveyor as the shuttlecar bends to turn corners.

Adjacent shuttlecar sections are pivotally connected to each other at a vertical axis 5 by an articulation joint 5a. Each of center section 2 and end section 3 have an arcuate floor section 9 at one end, which overlaps a plate and is received in a cooperating arcuate recess in the end of the floor of the adjacent section to which it is connected. Hence, the upper run of conveyor 4 is continuously supported when the shuttlecar bends to turn a corner. As shown in FIG. 2 of the drawings, the conveyor can flex as required when the shuttlecar turns a corner and it is never unsupported.

A pair of wheels 13 is provided for each shuttlecar section 1, 2 and 3. Each pair of wheels is rotatable about a common axis 11 and each wheel is suspended on the trailing arm of an adjustable suspension system (not shown) which is the subject of our U.S. patent application Ser. No. 07/906,758 filed contemporaneously herewith. Each pair of wheels 13 is driven by a motor 15 and a transmission system which is the subject of our U.S. patent application Ser. No. 07/906,894 which is filed contemporaneously herewith.

The center section of the shuttlecar is provided with a horizontal pivot 10 which is coaxial with wheel axis 11 for that section. The horizontal pivot allows the center section to flex vertically, so that it can negotiate undulations in mine tunnel floors with minimum headroom.

Figure 3:
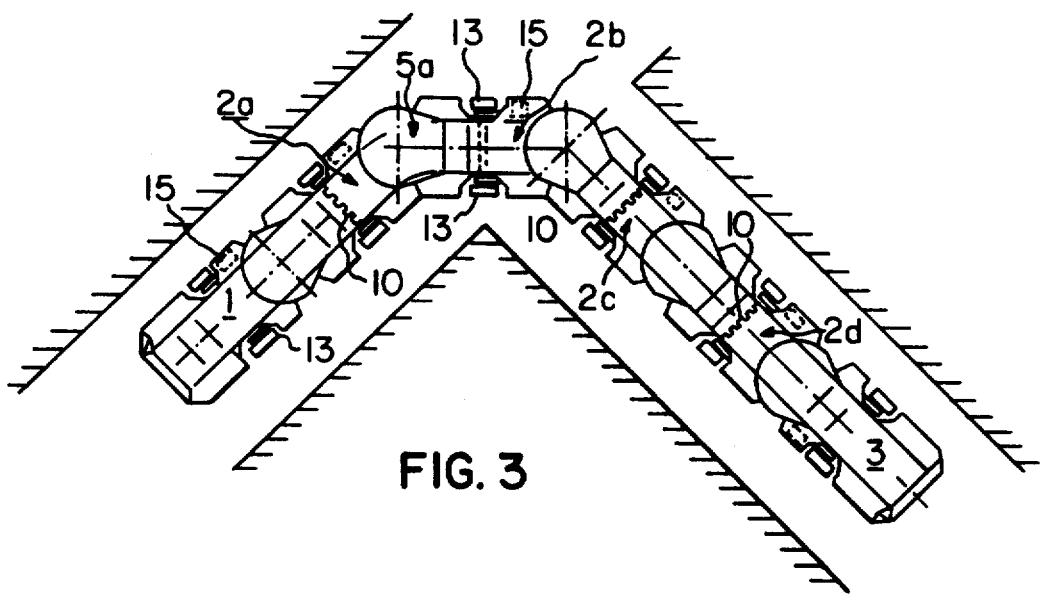
FIG. 3 is a plan view of an embodiment of a shuttlecar having six sections in a turning mode.
Figure 4:
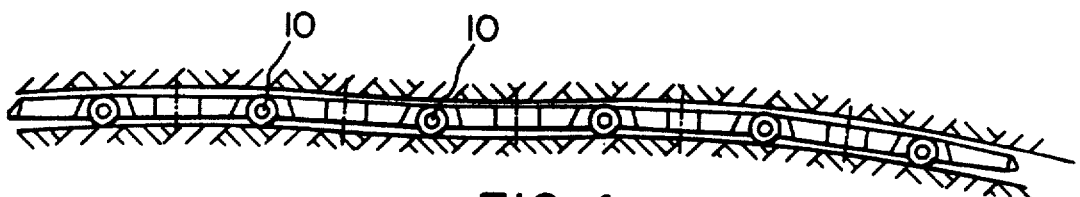
FIG. 4 is a schematic elevation of the shuttlecar of FIG. 3 on an undulating surface.
Figure 5:
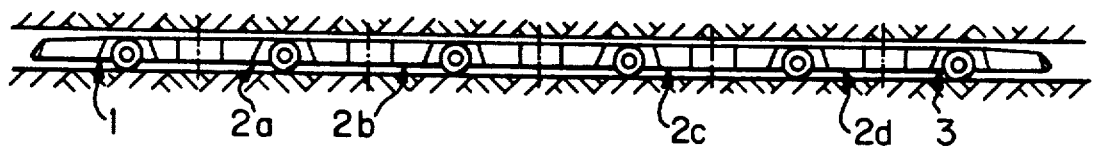
FIG. 5 is an elevation similar to FIG. 4 on a flat surface.

Referring to FIGS. 3-5 of the drawings, the shuttlecar is provided with a first end section 1, a second end section 3 and four intermediate sections 2a-2d. Each intermediate section is provided with a pair of wheels 13 suspended by an adjustable suspension system (not shown), and each wheel is driven by a motor 15 and a transmission system (not shown). The sections of the shuttlecar adjacent the front and rear sections are steered by a rack and pinion steering system (not shown) to rotate the sections relative to one another about a horizontal articulation joint 5a. Each intermediate section of the shuttlecar is provided with a horizontal pivot 10 to permit articulation of the section in the vertical plane. The shuttlecar is thereby capable of articulating in the horizontal plane as shown in FIG. 3 of the drawings, and in the vertical plane as shown in FIG. 4 of the drawings.

While specific embodiments of the invention have been described in detail herein, it will be appreciated by those skilled in the art that various modifications and alternatives to those embodiments could be developed in light of the overall teachings of the disclosure. Accordingly, the particular arrangements are illustrative only and are not limiting as to the scope of the invention which is to be given the full breadth of the appended claims and any and all equivalents thereof.

We claim:

1. An elongated bi-directional horizontally articulated shuttlecar for transporting loose mined material from a first location where material is mined to a second location in a mine, said shuttlecar having at least one intermediate section and an end section adjacent to each end of said at least one intermediate section, vertical pivot means connecting each end of said at least one intermediate section to an end of one of said end sections, each of said sections of said shuttlecar having a pair of driven wheels mounted on a substantially horizontal axis, a separate motor for driving each pair of driven wheels to move said shuttlecar from a first location to a second location to transport loose mined material between the first and second locations, a continuous flexible conveyor having an upper surface and extending throughout the length of all of said sections of said shuttlecar, means for moving said continuous flexible conveyor relative to said sections of said shuttlecar for moving loose mined material from one end of said shuttlecar to the other end of said shuttlecar to substantially fill said upper surface of said conveyor with loose mined material and to support loose mined material during movement of said shuttlecar from a first location to a second location, spaced longitudinal edges on each of said sections of said shuttlecar, and a continuous flexible raised retaining means located along each of said spaced longitudinal edges of said sections of said shuttlecar for maintaining loose mined material on said single continuous flexible conveyor during filling of said conveyor an during movement of the shuttlecar for transportation of the loose mined material from a first location to a second location and an on-board operator station having controls on each of said end sections of said shuttlecar, whereby said bi-directional shuttlecar moves in a first direction with an operator in the operator station on the leading end section of said shuttlecar and moves in a second direction opposite the first direction with an operator in the operator station on the leading end section of said shuttlecar, whereby the movement of said shuttlecar is reversible for operation by an operator in an on-board operator station without turning said shuttlecar around.

2. An articulated shuttlecar as set forth in claim 1 wherein said center section includes a horizontal pivot to permit vertical articulation of said center section.

3. An articulated shuttlecar as set forth in claim 2 wherein said horizontal pivot substantially coincides with the axis for said wheels on said center section.

4. An articulated shuttlecar as set forth in claim 1 having a plurality of pivotally connected center sections and an end section pivotally connected to the free end of the first and last center sections of said elongated shuttlecar.

5. An articulated shuttlecar as set forth in claim 4 wherein each of said center sections includes a horizontal pivot to permit vertical articulation of said center sections.

6. An articulated shuttlecar as set forth in claim 5 wherein each of said horizontal pivots substantially coincides with the axis for said wheels on said center sections.

* * * * *

UNITED STATES PATENT AND TRADEMARK OFFICE
CERTIFICATE OF CORRECTION

PATENT NO. : 5,301,787

DATED : April 12, 1994

INVENTOR(S) : Michael Etherington and Michael R. Long

It is certified that error appears in the above-indentified patent and that said Letters Patent is hereby corrected as shown below:

Title page, item [56], under References Cited, OTHER PUBLICATIONS, in the third reference, "Elmco" should read --Eimco--.

Column 3 Line 67 "pivot vertical" should read --vertical pivot--.

Column 3 Line 67 "51" should read --5--.

Claim 1 Line 17 Column 5 "an" should read --and--.

Signed and Sealed this

Nineteenth Day of July, 1994

Attest:

BRUCE LEHMAN

Attesting Officer     Commissioner of Patents and Trademarks